United States Patent
Krishnamurthy et al.

(10) Patent No.: US 8,762,342 B1
(45) Date of Patent: Jun. 24, 2014

(54) METHOD OF INSERTING A VALIDATED TIME-IMAGE ON THE PRIMARY CDP SUBSYSTEM IN A CONTINUOUS DATA PROTECTION AND REPLICATION (CDP/R) SUBSYSTEM

(75) Inventors: Raghu Krishnamurthy, Santa Clara, CA (US); Robert Koeten, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 134 days.

(21) Appl. No.: 13/083,655

(22) Filed: Apr. 11, 2011

Related U.S. Application Data

(63) Continuation of application No. 11/731,351, filed on Mar. 30, 2007, now Pat. No. 7,925,630.

(51) Int. Cl.
*G06F 17/30* (2006.01)
*G06F 11/14* (2006.01)

(52) U.S. Cl.
CPC ...... *G06F 17/30088* (2013.01); *G06F 11/1469* (2013.01)
USPC .......................................... 707/649; 711/162

(58) Field of Classification Search
CPC .............................................. G06F 17/30088
USPC .................................................. 707/648–649
See application file for complete search history.

(56) References Cited

U.S. PATENT DOCUMENTS

| | | | |
|---|---|---|---|
| 6,912,631 B1 * | 6/2005 | Kekre et al. | 711/162 |
| 7,055,059 B2 * | 5/2006 | Yanai et al. | 714/6.32 |
| 7,308,545 B1 * | 12/2007 | Kekre et al. | 711/162 |
| 7,529,782 B2 * | 5/2009 | Prahlad et al. | 1/1 |
| 7,685,189 B2 * | 3/2010 | Mittal et al. | 707/686 |
| 7,707,184 B1 * | 4/2010 | Zhang et al. | 707/645 |
| 7,707,188 B2 * | 4/2010 | Pandya et al. | 707/668 |
| 2004/0268067 A1 * | 12/2004 | Yamagami | 711/159 |
| 2007/0112893 A1 * | 5/2007 | Okada et al. | 707/204 |
| 2007/0174569 A1 * | 7/2007 | Schnapp et al. | 711/162 |
| 2007/0276884 A1 * | 11/2007 | Hara et al. | 707/204 |
| 2008/0071842 A1 * | 3/2008 | Tokuda et al. | 707/202 |
| 2008/0104147 A1 * | 5/2008 | Schwaab et al. | 707/204 |
| 2008/0162599 A1 * | 7/2008 | Mittal et al. | 707/204 |
| 2009/0070390 A1 * | 3/2009 | Okada et al. | 707/202 |

OTHER PUBLICATIONS

Joseph Tucek, Paul Stanton, Elizabeth Haubert, Ragib Hasan, Larry Brumbaugh, William Yurcik "Trade-offs in Protecting StorageStorage: A Meta-Data Comparison of Cryptographic, Backup/Versioning, Immutable/Tamper-Proof, and Redundant Storage Solutions", IEEE Apr. 11-14, 2005.*

* cited by examiner

*Primary Examiner* — Polina Peach
(74) *Attorney, Agent, or Firm* — Campbell Stephenson LLP

(57) ABSTRACT

A method for inserting a validated time-image on a primary CDP subsystem in a continuous data protection and replication (CDP/R) subsystem. In one embodiment, the method includes processing data of RI1 at a secondary system in accordance with a recovery process, wherein RI1 is a first image of a replication of a data object. First data is generated in response to processing the data of RI1 in accordance with the recovery process, wherein the first data relates to processing the data of RI1 in accordance with the recovery process. Once the first data is generated, a copy of the first data is transmitted to a primary system that stores the data object.

11 Claims, 10 Drawing Sheets

| Time Stamp | Volume V Block ID | Journal Entry | |
|---|---|---|---|
| TS1 | 20 | 1 | 62 |
| TS2 | 7 | 2 | |
| TS3 | 200 | 3 | |
| ⋮ | ⋮ | ⋮ | |
| TSx | 5 | y | |

| Time Stamp | Result | |
|---|---|---|
| VTS1 | Valid | 64 |
| VTS2 | Valid | |
| VTS3 | Invalid | |
| ⋮ | ⋮ | |
| VTSw | Valid | |

| Time Stamp | Image Validation Result | Scratchpad Journal Entry |
|---|---|---|
| VTS1 | Valid | 1 |
| VTS2 | Valid | 2 |
| VTS3 | Invalid | null |
| ⋮ | ⋮ | ⋮ |
| VTSw | Valid | s |

METHOD OF INSERTING A VALIDATED TIME-IMAGE ON THE PRIMARY CDP SUBSYSTEM IN A CONTINUOUS DATA PROTECTION AND REPLICATION (CDP/R) SUBSYSTEM

CROSS-REFERENCE TO RELATED APPLICATIONS

The present patent application is a continuation of U.S. patent application Ser. No. 11/731,351, filed on Mar. 30, 2007, now U.S. Pat. No. 7,925,630, entitled "Method of Inserting a Validated Time-Image on the Primary CDP Subsystem in a Continuous Data Protection and Replication (CDP/R) Subsystem" and is incorporated by reference herein in its entirety and for all purposes.

BACKGROUND OF THE INVENTION

Businesses or other entities store production data (e.g., customer lists, financial transaction data, business documents, etc.) in memory of data processing systems. This data is susceptible to corruption. Programming errors unwittingly added into a poorly developed software application may lead to inadvertent corruption of production data. Data corruption can also occur when users unwittingly delete or overwrite production data. Data processing systems that store and process production data are susceptible to hardware or software failure, which renders the data processing systems unavailable to those seeking to use it.

SUMMARY OF THE INVENTION

A method for inserting a validated time-image on a primary CDP subsystem in a continuous data protection and replication (CDP/R) subsystem. In one embodiment, the method includes processing data of RI1 at a secondary system in accordance with a recovery process, wherein RI1 is a first image of a replication of a data object. First data is generated in response to processing the data of RI1 in accordance with the recovery process, wherein the first data relates to processing the data of RI1 in accordance with the recovery process. Once the first data is generated, a copy of the first data is transmitted to a primary system that stores the data object.

BRIEF DESCRIPTION OF THE DRAWINGS

The present invention may be better understood, and its numerous objects, features, and advantages made apparent to those skilled in the art by referencing the accompanying drawings.

FIG. 8 is a graphical representation of an example validation table employed in the data processing system of FIG. 6;

The use of the same reference symbols in different drawings indicates similar or identical items.

DETAILED DESCRIPTION

Figure 1:
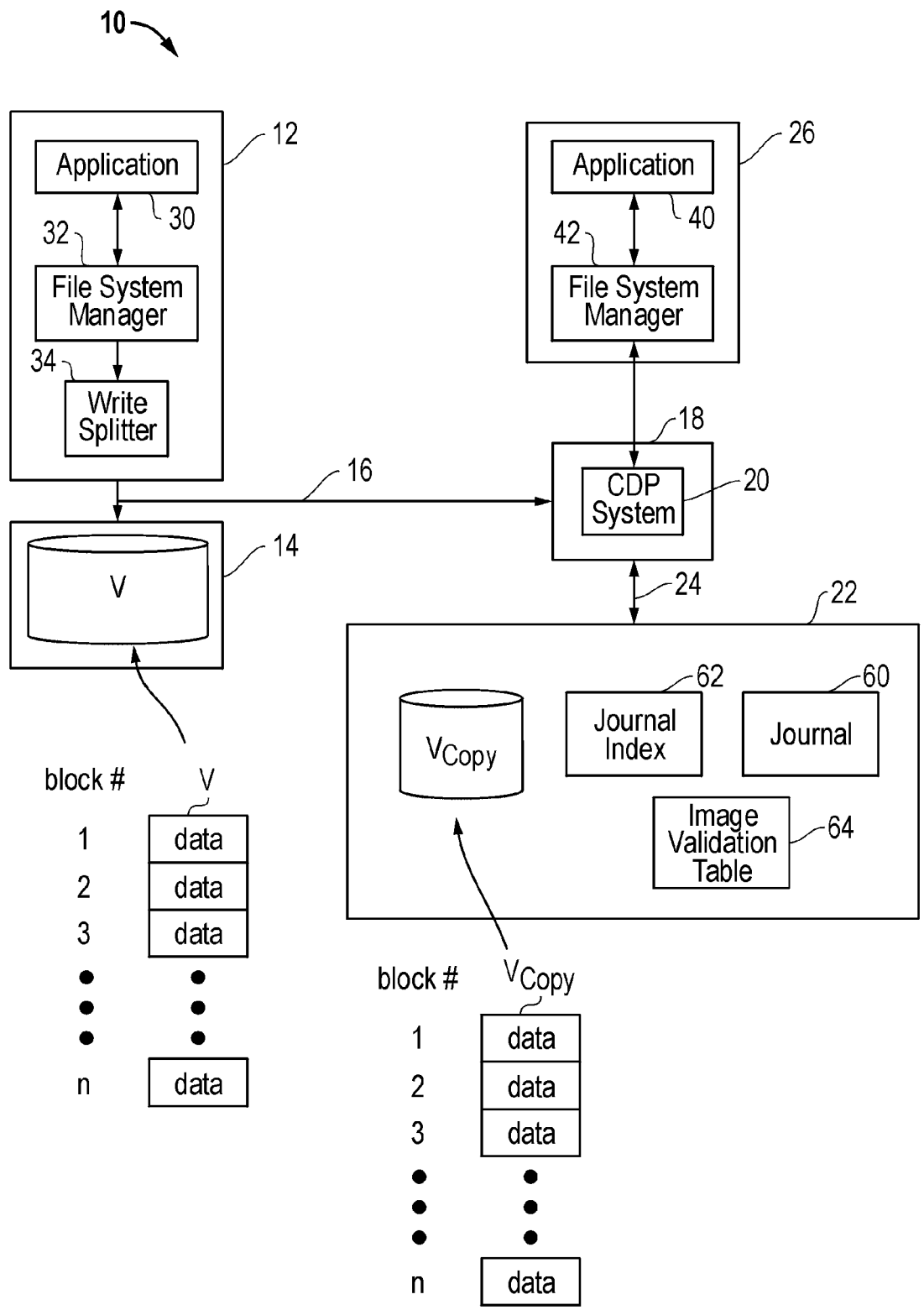
FIG. 1 illustrates a block diagram of relevant components in a data processing system.

Data corruption and/or data processing system unavailability can be devastating to a business, including those that rely heavily on electronic commerce. Businesses often employ continuous data protection (CDP) systems to protect themselves against unexpected data corruption. CDP systems can provide restoration data for use in restoring corrupted data objects to the state the data objects occupied prior to the corrupting event. Businesses or other entities may also employ secondary data processing systems to protect against primary data processing system unavailability. Replication is a technique that may be used to maintain a copy of production data at a geographically remote, secondary data processing system.

In the following description, an embodiment of the present invention can be implemented as a computer program executing on one or more processors of one or more computer systems, although those skilled in the art will readily recognize that the equivalent of such software may also be constructed in hardware or a combination of hardware and software. If the invention is implemented as a computer program, the program may be stored in one or more conventional computer readable mediums that may include, for example: magnetic storage media such as a magnetic disk (e.g., a disk drive); optical storage media such as an optical disk; solid state electronic storage devices such as random access memory (RAM), or read only memory (ROM); or any other device or medium employed to store computer program instructions.

The invention(s) described herein may be employed in conjunction with a CDP system. In general CDP systems log changes to a production data set. Using the logged changes, CDP systems can provide time images of the production data set. Time images can be seen as virtual copies of the production data set as it existed at respective prior points-in-time. The contents of a time image can be used to restore a corrupted data object to the data state that existed prior to a data corrupting event. Before a time image can be used to restore a corrupted data object, however, the image should be validated via one or more recovery processes (e.g., file system check or FSCK) applied directly or indirectly to the time image presented by the CDP system.

Businesses or other entities often store their production data in data objects such as files of one or more file systems. File systems, in turn, are often stored on underlying data objects such as data volumes. File systems and data volumes are logical data structures. A data volume may be seen as a collection of data blocks, each of which stores or is configured to store data. While it is said that a volume data block stores data, in reality the data is stored in a respective physical memory block of physical memory such as a hard disk in a disk array. Thus, while it is said that a file stores data, in reality data of the file is stored in one or more physical memory blocks mapped thereto via one or more data blocks of a volume. The present invention will be described with reference to a method or apparatus that may reduce the time needed to restore data contained in a corrupted file, it being understood that the present invention should not be limited thereto; the present invention could be used to reduce the time needed to restore the contents of other data objects such as databases.

FIG. 1 illustrates relevant components of a data processing system 10 employing continuous data protection (CDP). System 10 includes a computer system 12 (e.g., a server) coupled to a data storage system 14 via a network 16. A computer system (e.g., a network appliance) 18 is also coupled to network 16 and includes a CDP system 20. In one embodiment, CDP system 20 takes form in instructions executing on one or more processors of network appliance 18. CDP system 20 is shown coupled to a data storage system 22 via communication link 24. Lastly, system 10 includes computer system 26 coupled to appliance 18 and configured to execute one or more software components. In an alternative embodiment, the software components executing on computer system 26 may execute on network appliance 18, thereby obviating the need for separate computer system 26.

Data storage system 14 may take form in one or more disk arrays. Although not shown, virtualization software such as a volume manager executing on server 12 or executing on a device external to server 12, logically aggregates memory provided by hard disks of the disk arrays to create a logical data volume V. FIG. 1 shows a graphical representation of data volume V. As shown, volume V includes n data blocks. For ease of explanation only, each of n logical data blocks is presumed to store data or metadata of a respective file of a file system FS (not shown). The present invention, however, should not be limited thereto; the present invention can be employed in a system in which one or more logical blocks of volume V store data or metadata of a file. While it is said that a data block of volume V stores data or metadata, in reality the data or metadata of each logical volume block is stored in a respectively mapped physical block of a hard disk within data storage system 14.

Data storage system 22 may also take form in one or more disk arrays. Although not shown, virtualization software such as a volume manager executing on appliance 18 or on device external to appliance 18, may logically aggregate memory of hard disks of data storage system 22 to create a second data volume (hereinafter volume Vcopy) that stores a point-in-time copy of the data in volume V. FIG. 1 shows a graphical representation of volume Vcopy, which includes n data blocks corresponding to the n data blocks of volume V, respectively. The n data blocks of volume Vcopy store a copy of the contents contained within the n blocks, respectively, of volume V that existed at the time volume Vcopy was first created. In another embodiment, volume Vcopy is a continuously updated copy of volume V rather than a static copy of volume V. In this alternative embodiment, all write transactions that modify data or metadata of volume V subsequent to its creation, are likewise implemented on volume Vcopy in order to maintain volume Vcopy as a continuous or up-to-date copy of volume V. The present invention, however, will be described with reference to volume Vcopy as an unchanging point-in-time copy of volume V; volume Vcopy, subsequent to its creation, is not updated in parallel with volume V. As will be more fully described below volume Vcopy can be seen as a component of time images of volume V that are provided by CDP system 20, and contents of volume Vcopy may be used to restore a corrupted file of file system FS.

Server 12 includes a file system manager 32 in data communication with an application 30 and a write splitter 34. File system manager 32 manages file system FS mentioned above. Each of the software components 30-34 may take form in instructions executing on one or more processors of server 12. It is noted that write splitter 34 is shown to be a software component separate and apart from file system manager 32. In an alternative embodiment, write splitter 34 may be part of another component such as file system manager 32. Although not shown, server 12 may implement additional software components such as a database manager in data communication with application 30 and file system manager 32, which operate on data contained in volume V. The present invention, however, will be described with reference to application 30 and file system manager 32.

Computer system 26 includes an application 40 in data communication with a file system manager 42. Application 40 and file system manager 42 may take form in instructions executing on one or more processors of computer system 26. In one embodiment, application 30 is identical to application 40, and file system manager 32 is identical to file system manager 42. If sever 12 included additional software components (e.g., a database manager), then computer system 26 may include copies of each of the additional software components.

Application 40 and file system manager 42 may each include a distinct recovery module. Images of volume V can be validated via the recovery modules of application 40 and/or file system manager 42 as will be more fully described below. During image validation, the recovery module (e.g., FSCK) of file system manager 42 may generate transactions to read or write data or metadata to a time image of volume V provided by CDP system 20. Moreover, during image validation, the recovery module of application 40 may generate transactions to read or write data to the image of volume V via file system manager 42. The present invention should not be limited to validating images via the recovery modules of file system manager 42 and application 40, let alone validating images on the volume level. In other embodiments, validation may include processing data of an image via one or more recovery modules of other software components such as a volume manager, database manager, etc. In this embodiment, processing data of the image via these one or more additional may occur before or after the recovery modules of file system manager 42 and/or application 40. For ease of illustration only, the present invention will be limited to validating images at the volume level (i.e., validating images of volume V) via the recovery modules of file system manager 42 and/or application 40.

The recovery module of file system manager 32 checks for and repairs file system metadata inconsistencies. At a high level, the recovery module traverses all file system metadata contained in the image provided by CDP system 20, starting with the root directory, checking inodes and directories for internal consistency, rebuilding inode and block allocation maps, and checking for overall consistency between all metadata. In one embodiment, the process performed by the recovery module of file system manager 42 may include reading metadata and/or data from the image of volume V, checking the metadata, correcting the metadata if needed, and writing the corrected metadata. If the metadata read from the image is not consistent, the metadata should be corrected. Metadata inconsistencies may arise as the result of write-data that is pending in buffers (but not yet flushed to volume V) of file system manager 32 when the image validation process begins. Most of the time, any inconsistencies with the metadata (such as deleted inodes still marked in use) are minor. In the majority of cases, the file system recovery module will be able to detect and repair such inconsistencies. Unfortunately, the entire process takes time proportional to the amount of file system metadata and involves many read transactions to, for example, follow links and block pointers.

Transactions to write data to the image during the process performed by the recovery module of file system manager 42, may include a transaction to write "final metadata." At the end of processing if the recovery module of file system manager 42 indicates that the metadata of the image is consistent, the final metadata written will indicate that all metadata of the image is consistent. If at the end of processing the recovery module of file system manager 42 indicates that metadata of the image is inconsistent and cannot be repaired, the final metadata written will indicate that metadata of the image is inconsistent. In general, when the recovery module of file system manager 42 is first initiated, the recovery module may first generate a transaction to read the data block where final metadata should be stored, and if the data read from that block indicates image consistency, no further processing is needed by the recovery module of file system 42. If however, the final metadata indicates that metadata of the image is inconsistent, then the recovery module will proceed with its recovery processing. The recovery module of application 40 may operate in a similar fashion during image validation. However, it should be understood that image validation may involve only the recovery module of file system manager 42 in an alternative embodiment.

New data or metadata to be written by write transactions generated directly or indirectly by the recovery modules of application 40 and file system manager 42 during image validation, is temporarily stored in a scratchpad memory (not shown) of appliance 18. After the image is validated, the content of the scratchpad memory is eventually erased, including final metadata indicating whether image metadata is consistent or inconsistent.

In the normal course of operation, application 30 may generate transactions to read data from files, process data of files, and/or write new data to files in response to receiving requests from client computer systems (not shown) in data communication via a network (not shown) such as the Internet. File system manager 32, in response to receiving transactions from application 30, may generate transactions to read, process, and/or write new data or metadata to the block(s) of data volume V that store file system FS. Write splitter 34 may create a copy of each transaction it receives from file system manager 32 for writing new data or metadata to volume V. Write splitter 34 sends copies of each write transaction it creates to CDP system 20 via network 16.

Figures 2, 3, 4:
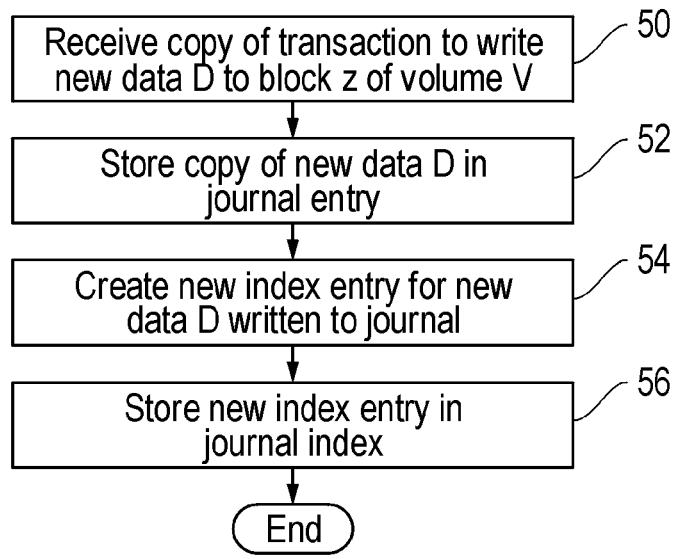
FIG. 2 illustrates relevant aspects of a process implemented by the continuous data protection system of FIG. 1.
FIG. 3 is a graphical representation of an example validation table employed in the data processing system of FIG. 1.
FIG. 4 is a graphical representation of an example journal index employed in the data processing system of FIG. 1.

CDP system 20 logs a copy of new data or metadata contained in each write transaction it receives from write splitter 34. FIG. 2 illustrates relevant operational aspects of an embodiment of this logging process in greater detail. More particularly, as shown in step 50, CDP system 20 receives a copy of a transaction to write new data (or metadata) D to block z (or a set of consecutive blocks beginning with block z) of volume V, where z is a variable between 1 and n. The present invention will be described with reference to CDP system 20 receiving write transactions that write new data D to a single block z of volume V, it being understood that the present invention should not be limited thereto. In response to receiving the write transaction, CDP system 20 may store a copy of new data D in an entry of journal 60, which, in one embodiment, is formed in memory of data storage system 22 (see FIG. 1). In step 54, CDP system 20 may create a new index entry when new data D is written to journal 60 in step 52. The index entry identifies the entry in journal 60 containing new data D. The index entry should include a time stamp TSx identifying the time when the transaction (or copy thereof) for writing new data D (received in step 50) was generated by file system manager 32. For the purposes of explanation, it will be presumed that time stamp TSx is contained in the transaction received in step 50. Lastly, the index entry created in step 54 may include the block number (i.e., z) identified in the transaction received in step 50. For ease of explanation only, it will be presumed the transaction received in step 50 overwrites all data in block z. The present invention however should not be limited thereto. In the embodiment where less than all data of block z is overwritten with new data, the index created in step 54 may also include an offset from the beginning of block z where new data D is to be written. In the embodiment where transactions received in step 50 are directed towards writing new data to several consecutive blocks of volume V, the index may include the identity of the first block and the identity of last block of the extent of blocks into which data D is to be written by the write transaction.

With continuing reference to FIGS. 1 and 2, CDP system 20 stores the newly created index entry into journal index 62 as shown in step 56. In one embodiment, journal index 62 is formed in memory of data storage system 22. FIG. 3 shows a graphical example of journal index 62. As shown, each index entry in journal index 62 identifies a corresponding entry in journal 60 where data is stored. Each entry in journal index 62 also includes time stamp indicating when file system manager 32 generated the transaction for writing the data stored in the corresponding entry of journal 60. Lastly, each entry shown in FIG. 3 includes the block number of volume V where data stored in the corresponding entry of journal 60, was also written.

CDP system 20 can use volume Vcopy, journal 60, and journal index 62 to provide time images of volume V. In one sense the time images are virtual copies of volume V that existed at prior points in time. Time images of volume V can be used to restore a corrupted file of file system FS to the data state it occupied prior to the corruption. To illustrate, suppose data of a file F (not shown) is inadvertently overwritten by a transaction generated by application 30. When the corruption is discovered, a restoration manager (not shown) executing on server 12 can initiate a restore process for restoring file F to its prior, valid data state. Once the restore process is initiated, the restoration manager may generate a request for a copy of the data contained within the block or blocks of volume V mapped to corrupted file F at time t2, where t2 is prior to the time when file F was corrupted. For ease of explanation only, it will be assumed that a single block f of volume V is mapped to file F for storing its file data, it being understood that in alternative embodiments, data in file F may be stored in several volume blocks mapped to the file. With this assumption, the restoration manager may generate and send a request to CDP system 20 for a copy of the data of block f that existed at t2.

CDP system 20 can provide an image of volume V as it existed at time t2, and can retrieve a copy of the requested restoration data from this image. Before CDP system 20 can retrieve the requested restoration data from the image, however, that image should be validated via the recovery modules of application 40 and/or file system manager 42. Unfortunately, image validation can be a lengthy and time consuming process that involves reading data or metadata of the image sought to be validated, processing the data or metadata read from the image, and/or writing data or metadata. Restoration of file F may be substantially delayed in order to validate the image, if the image can be validated at all. The delay caused by image validation may be exacerbated in situations where the image that contains the requested restoration data, cannot be validated. For example, suppose the image of volume V that existed at time t2, cannot be validated at that time via the recovery modules of application 40 and/or file system manager 42. When this happens, CDP system 20 can select or is told to select and provide an alternative, prior image of volume V (i.e., an image of volume V as it existed at t1, a point in time earlier than t2). Thereafter, the validation process is restarted against the alternative, prior image of volume V.

Once an image of volume V has been validated at time t2, t1, or earlier, CDP system 20 accesses the validated image to retrieve a copy of the data that was contained in block f. The data retrieved by CDP system 20 is returned to the restoration manager as restoration data for block f of volume V. The restoration manger subsequently overwrites the corrupted data of block f of volume V with the restoration data received from CDP system 20, thereby restoring block f (and thus file F) to the data state it occupied at or just prior to t2.

As noted, image validation may require a substantial amount of time to complete, which in turn delays file restoration. If several images of volume V must be processed via the recovery modules of application 40 and/or file system 42 before a valid image is identified, file restoration will be delayed even more. In an alternative embodiment, images of volume V can be pre-validated to avoid delays caused by image validations that fail as a result of, for example, incapability of the recovery module of file system manager 42 to correct inconsistent metadata. More particularly, images of volume V can be subjected to the validation process at regularly scheduled times (e.g., approximately every 10 minutes or each time after the CDP system receives 10,000 write transactions) subsequent to initial creation of volume Vcopy. In one embodiment, a timer tracks the time since the last image validation. Once a predetermined amount of time (e.g., 10 minutes) has passed since the last image validation, the validation process is implemented for the image of volume V that existed at the time identified by the time stamp contained in the next write transaction received by CDP system 20 from write splitter 34. The timer is reset to 0 after the validation process is started. In an alternative embodiment, a counter can be used to count the number of write transactions received by CDP system 20 from write splitter 34, and the validation process is implemented for the image of volume V that existed at the time identified by the time stamp contained in the next write transaction received by CDP system 20 after the counter indicates that a predetermined number (e.g., 10,000) of write transactions have been received. The counter is reset to 0 after the validation process is started.

CDP system 20 can record the results of each regularly scheduled validation process in a validation table 64, which may be formed in memory of data storage system 22 (see FIG. 1). FIG. 4 illustrates a graphical representation of an example of image validation table 64. More particularly, image validation table 64 shown in FIG. 4 includes several entries created by CDP system 20, each of one of which includes a time stamp VTSx and a result of the validation process performed on the volume V image as it existed at the time identified by the time stamp VTSx. If the image of volume V is successfully validated (e.g., the final metadata written by the recovery module of file system 42, will indicate all metadata for the image is consistent), the result in the entry is marked "valid." If the image cannot be successfully validated (e.g., the final metadata will indicate metadata for the image is inconsistent), the result is marked as "invalid."

Figure 5:
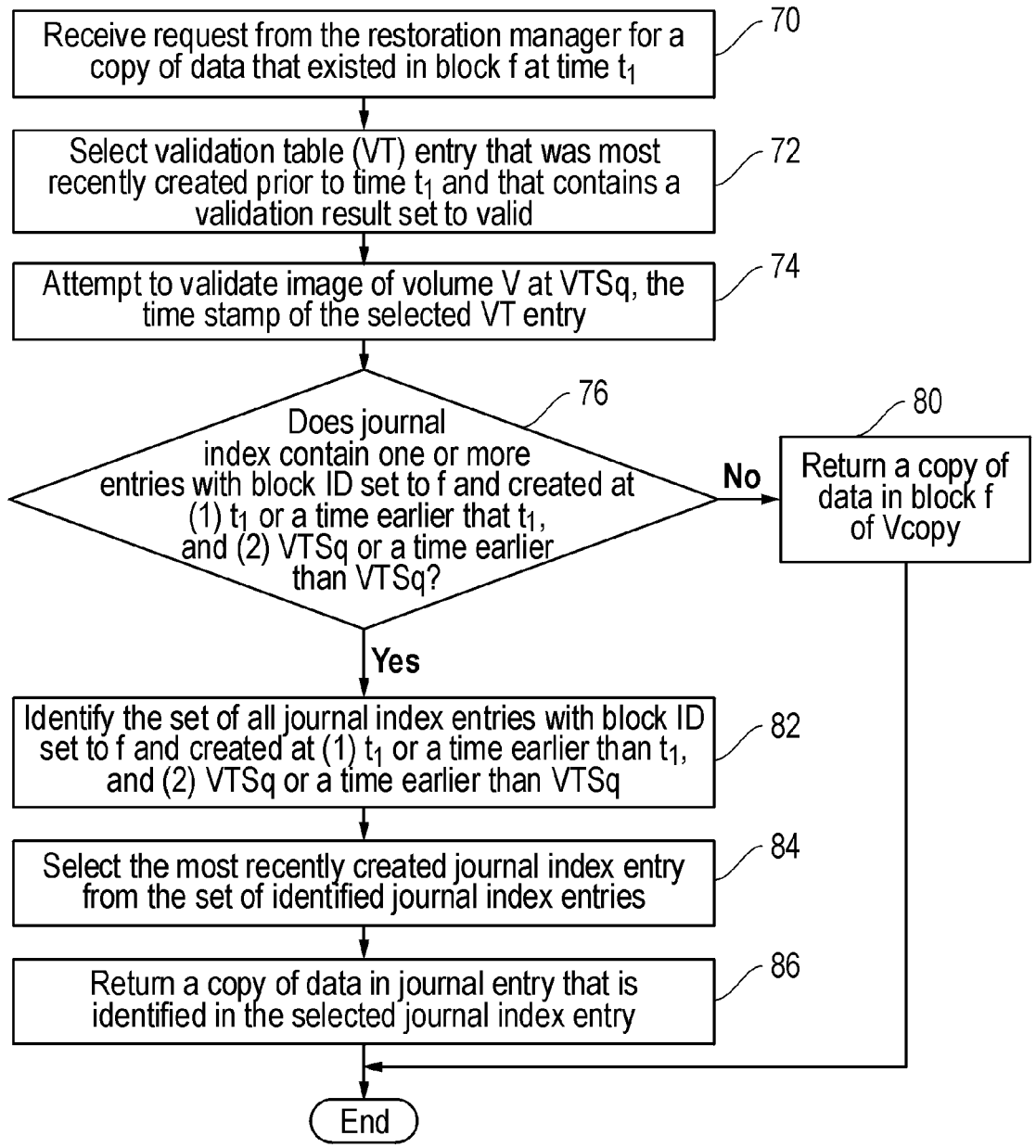
FIG. 5 illustrates relevant aspects of a process implemented by the continuous data protection system of FIG. 1.

CDP system 20 can use the image validation table 64 to select an image of volume V that contains needed restoration data and that is known to be valid when CDP system 20 receives a request for the restoration data, thus eliminating restoration delay caused by one or more failed attempts at image validation. FIG. 5 illustrates an example of this process in greater detail. More particularly, the process shown in FIG. 5 initiates when CDP system 20 receives a request for a copy of the data in block f that existed at t1, where f is a variable between 1 and n, and where n is the last block of volume V (or Vcopy). In step 72 CDP system 20 accesses image validation table 64 and compares the timestamps contained therein with time t1 in order to identify and select the most recently created "valid" validation table entry that was also created prior to time t1. For the purposes of explanation only, it will be presumed that image validation table 64 includes at least one valid entry created prior to time t1.

In step 74 the validation process described above is again implemented against the image of volume V that existed at VTSq, the time stamp contained in the entry of the validation table that was selected in step 72. More particularly, the validation process is implemented to validate the image of volume V that existed at time VTSq, the time stamp of the image validation table 64 entry that was selected in step 72. During image validation, the recovery module of file system manager 42 may generate transactions to read and/or write data (or metadata) to the image provided by CDP system 20. New data (or metadata, including the final metadata described above) of the write transactions is temporarily stored in a scratchpad memory (not shown) of appliance 18; the new data (or metadata, including the final metadata described above) is not written to journal 60 or Vcopy. While validation process of step 74 may take a substantial amount of time to complete, at the very least the validation process will succeed since the image of volume V that existed at time VTSq is known in advance to be pre-validated.

Once the image of volume V provided by CDP system 20 is validated in step 74, the operation can proceed for restoring block f on volume V. In step 76 journal index 62 is accessed by CDP system 20. Specifically, CDP system 20 accesses journal index 62 to identify whether it contains one or more entries with block ID equal to f and created at (1) time t1 or a time earlier than t1, and (2) time VTSq or a time earlier than VTSq. If no entry is identified in journal index 62 at step 76, CDP system retrieves a copy of the data of block f of Vcopy, and CDP system 20 returns this data to the restoration manager as shown in step 80. However, if one or more journal index 62 entries are identified as satisfying the conditions set forth in step 76, then CDP system 20 collects the set of identified entries (if more than one) in step 82, and in step 84 CDP system 20 selects the most recently created journal index entry from the set collected in step 82. Thereafter, CDP system 20 accesses journal 60 to retrieve a copy of the data from the journal entry that is identified in the journal index entry that was selected in step 84. The data retrieved from journal 60 is subsequently returned to the restoration manager as the requested restoration data as shown in step 86. The restoration manager completes the restoration operation by overwriting data contained in block f of volume V with the data returned by CDP system 20 in step 86. Data written to the scratchpad memory of appliance 18 during the validation process of step 74 may then deleted.

Figure 6:
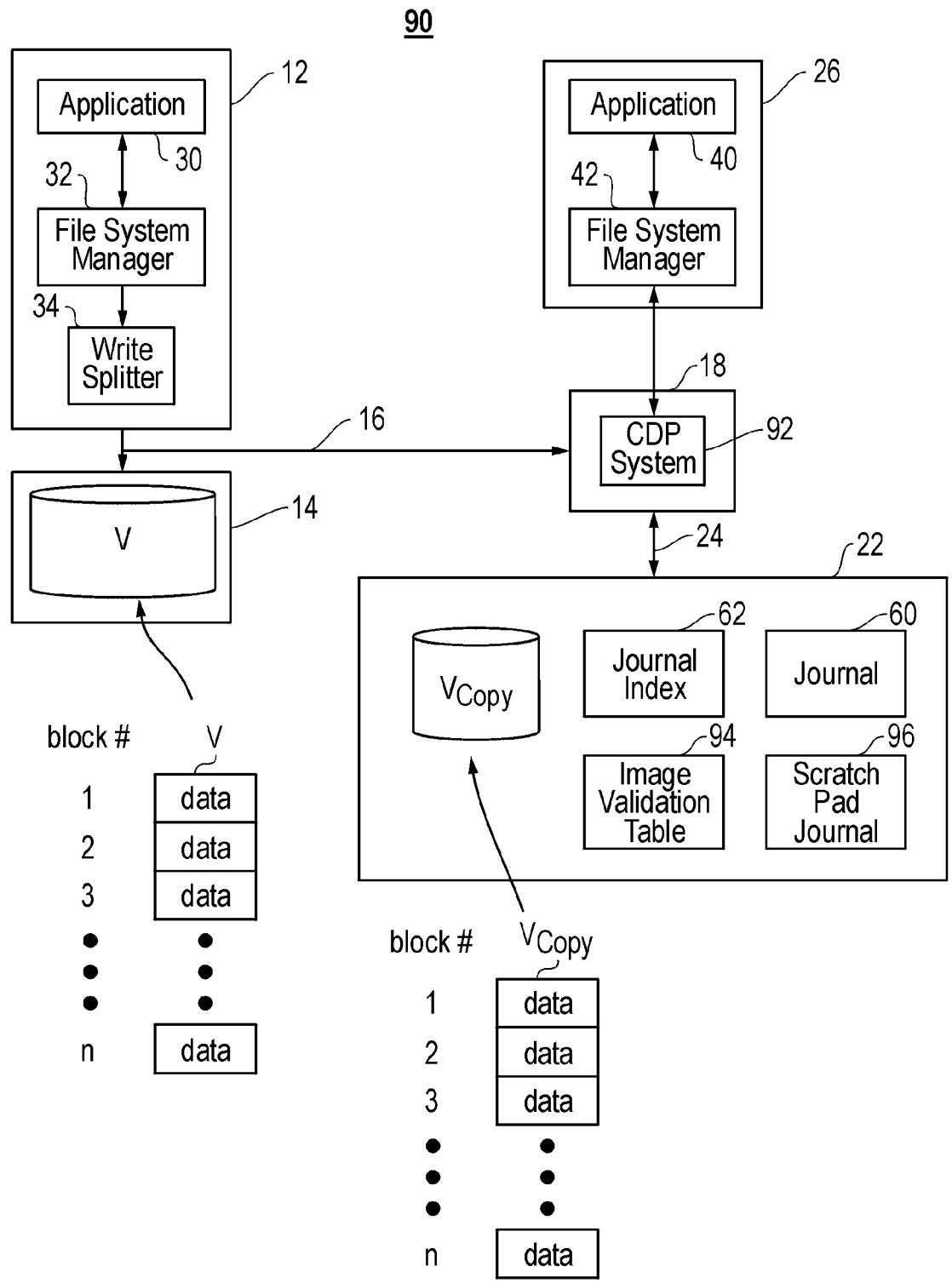
FIG. 6 illustrates a block diagram of relevant components in a data processing system.

While the process of FIG. 5 can eliminate restoration delay caused by repeated attempts to validate images provided by CDP system 20, the restoration operation is nonetheless delayed by the image validation process of step 74. In an alternative embodiment described with reference to FIG. 6, the validation process associated with step 74 can be reduced or eliminated, which in turn should reduce the time needed to complete a file restoration. FIG. 6 illustrates in block diagram form relevant components of a data processing system 90 employing an alternative CDP system 92. System 90 shown in FIG. 6 is similar to system 10 shown in FIG. 1 with CDP system 20 replaced by CDP system 92 and with image validation table 64 replaced by image validation table 94 and scratchpad journal 96, which will be more fully described below.

CDP system 92, like CDP system 20, can receive copies of transactions from write splitter 34 to write new data D to one or more blocks of volume V. CDP system 92 can operate according to the process shown in FIG. 2 in response to receiving a copy of a transaction to write new data D to volume V. In doing so, CDP system 92 creates and maintains journal index 62 and journal 60 in the same fashion as CDP system 20 described above.

Like system 10, system 90 validates images of volume V at regularly scheduled times (e.g., approximately every 10 minutes) subsequent to the initial creation of volume Vcopy. A timer may be provided that tracks the time since the last image validation. Once a predetermined amount of time (e.g., 10 minutes) has passed since the last image validation, the validation process is implemented for the image of volume V that existed at the time identified by the time stamp contained in the next write transaction received by CDP system 92. The timer is reset to 0 after the image validation process is started. In an alternative embodiment, a counter can be used to count the number of write transactions received by CDP system 92 from write splitter 34, and the validation process is implemented for the image of volume V that existed at the time identified by the time stamp contained in the next write transaction received by CDP system 92 after the counter indicates that a predetermined number (e.g., 10,000) of write transactions have been received. The counter is reset to 0 after the validation process is started.

Figure 7:
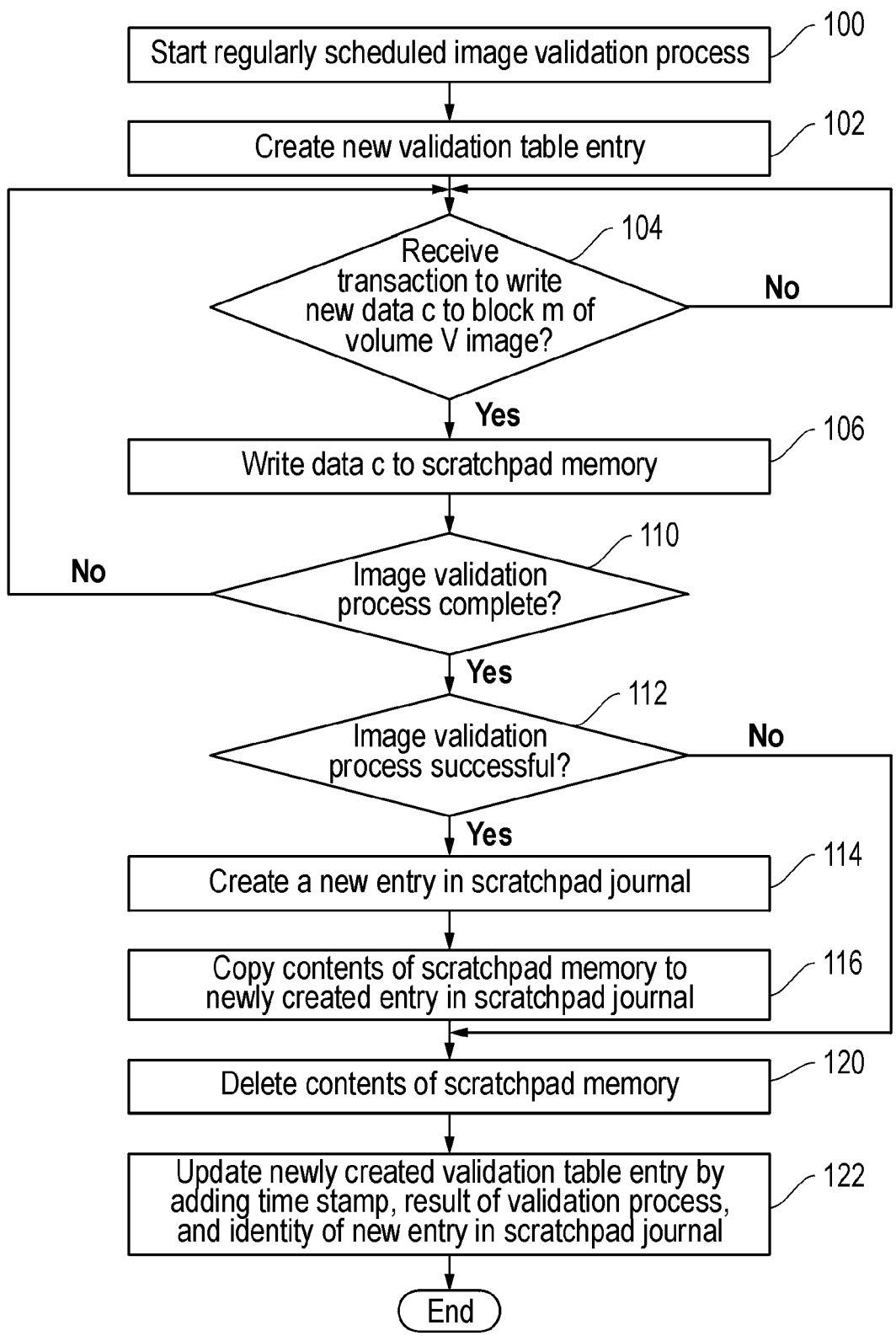
FIG. 7 illustrates relevant aspects of a process implemented by the data processing system of FIG. 6.

During image validation, the recovery module of file system manager 42 may generate transactions to read or write data of metadata to the image of volume V provided by CDP system 92. Moreover, during image validation, the recovery module of application 40 may generate transactions to read or write data to the image of volume V via file system manager 42. Data to be written to the image during image validation is temporarily stored in scratchpad memory of appliance 18. When the regularly scheduled validation process ends, CDP system 92 deletes the data written to the scratchpad memory, regardless of whether image validation was successful or not. However, at completion of the regularly scheduled image validation processes, CDP system 92 may copy the content of the scratchpad memory to scratchpad journal 96 before CDP system 92 deletes the contents of the scratchpad memory. FIG. 7 illustrates relevant aspects of this process in greater detail.

The process of FIG. 7 starts with a regularly scheduled image validation process. In one embodiment, as part of the image validation process the recovery module of file system manager 42 may complete before the recovery module of application 40 begins its part of the image validation process, assuming, in one embodiment, the process implemented by the recovery module of file system manager 42, is successful.

In step 102, CDP system 92 creates a new validation table entry. As will be shown below, this newly created validation table entry will be associated with the regularly scheduled image validation process. CDP system 92 should receive a transaction generated by the recovery module of file system manager 42 or by the file system manager itself, to write new data c (e.g., file metadata) to block m of volume V image as shown in step 104, where m is a variable. CDP system 92, in response as shown in step 106, writes data c to the scratchpad memory of appliance 18. It is noted that scratchpad memory may contain a copy of block m data as a result of CDP system 92 processing a prior write transaction generated by the recovery module of, for example, file system manager 42. In this situation, CDP system 92 may overwrite the existing data of block m in the scratchpad memory with new data c. In another embodiment, CDP system 92 may preserve the previously existing block m, and write the new data for block m into a time index entry of the scratchpad memory. One of ordinary skill in the art will recognize that a CDP system 92 may first access the scratchpad memory in attempt to retrieve data sought (including, in one embodiment, the most recently created time entry in the scratchpad memory that contains the data sought) by a read transaction generated during the validation process, and if the requested data is not contained in the scratchpad memory, CDP system 92 will access journal 60 and Vcopy in succession to retrieve data sought.

After new data c is written to the scratchpad memory, CDP system 92 may check to see whether it has received a signal(s) from the recovery modules of file system manager 42 and/or application 40, indicating that the validation process has completed. If no such signal(s) has been received after data c is written in step 106, CDP system 92 waits for the next write transaction in step 104. Eventually, however, CDP system will receive an indication that the image validation process has completed. If the image was successfully validated (e.g., the final metadata will indicate all metadata for the image is consistent), CDP system 92 will create a new entry in scratchpad journal 96 as shown in step 114. Then in step 116 CDP system 92 copies the contents of scratchpad memory (including, in one embodiment, the final metadata described above) in appliance 18 to the newly created entry in scratchpad journal 96. If CDP system 92 learns the image validation was unsuccessful (e.g., the final metadata will indicate the metadata for the image is inconsistent), or in response to copying the contents of scratchpad memory in step 116, CDP system 92 deletes the contents of the scratchpad memory in appliance 18 at that time as shown in step 120. Thereafter in step 122, CDP system 92 updates the newly created validation table entry by adding thereto (1) a time stamp identifying the image validation time (i.e., the time identified by the time stamp contained in the next write transaction received by CDP system 92 after the predetermined amount of time has passed since the last image validation), (2) the result of the validation process (i.e., valid or invalid), and (3) if the validation process is successful, the identity of the new entry in scratchpad journal 96 where the contents of the scratchpad memory were copied in step 116. Thereafter, CDP system 92 stores the updated validation table entry into validation table 94. FIG. 8 illustrates an example validation table 94 containing entries written by CDP system 92 during the process of FIG. 7.

Figure 9:
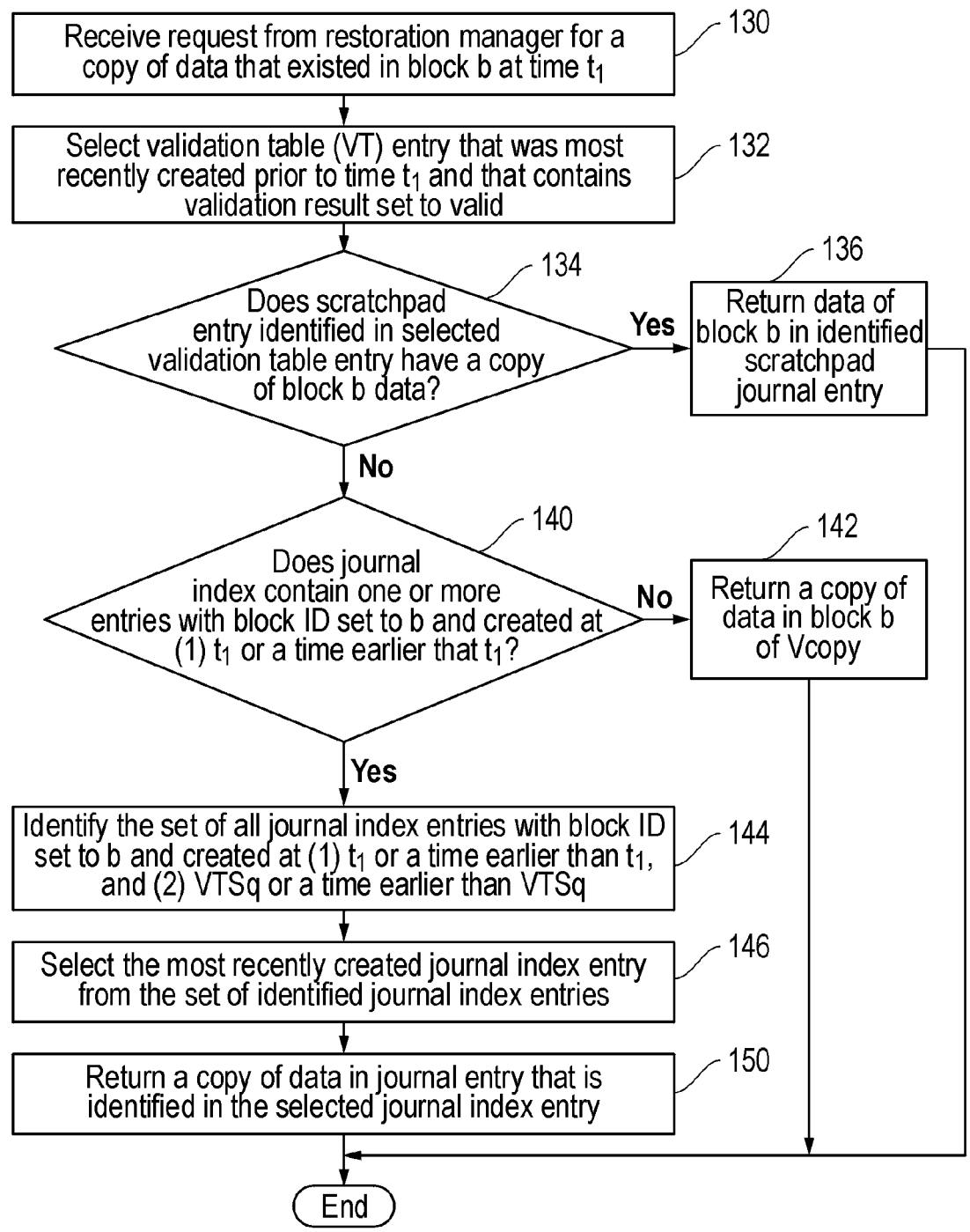
FIG. 9 illustrates relevant aspects of a process implemented by the continuous data protection system of FIG. 6.

CDP system 92, like CDP system 20, can receive requests for a copy of restoration data from the restoration manager (not shown) of server 12. FIG. 9 illustrates relevant operational aspects of a process implemented by CDP system 92 in response to receiving a request for restoration data. More particularly, in step 130, CDP system 92 receives a request for a copy of data that existed in block b of volume V as it existed at time t1, where b is a variable. In response, CDP system 92 accesses validation table 94 and compares time t1 with the timestamps contained in entries thereof. CDP system 92 selects the most recently created "valid" validation table entry that was also created at or prior to time t1 as shown in step 132. Thereafter CDP system 92 may access the scratchpad journal entry identified in the validation table entry that was selected step 132, to see if it contains a copy of block b data.

If it does, CDP system 92 returns to the restoration manager a copy of the block b data contained within the identified scratchpad journal entry as shown in step 136 and the process of FIG. 9 ends. It is noted that if data is time indexed in the scratchpad journal entry, CDP system 92 returns the most recent version of block b data stored in the scratchpad journal entry.

If the scratchpad entry does not contain block b data, then in step 140 CDP system 92 accesses journal index 62 to determine whether it contains one or more entries with block ID set to b and that were created at (1) time t1 or (2) a time earlier than t1. If no such entry is found by CDP system 92, CDP system 92 returns a copy of the data contained in block b of volume Vcopy as shown in step 142 and the process of FIG. 9 ends. However, if journal index 62 contains one or more entries that satisfy the conditions set forth in step 140, CDP system 92 identifies the set of those entries (if there is more than one) in step 144, and thereafter in step 146 CDP system 92 selects the most recently created journal index from the set of journal index entries identified in step 144. Thereafter, as shown in step 150, CDP system 92 returns a copy of the data in journal 60 that is identified in the journal index entry selected in step 146, and the process of FIG. 9 ends.

The process of FIG. 9 may eliminate any need to initiate an image validation operation in response to CDP system 92 receiving a request for restoration data. However, even if the validation process is initiated, the first data read by the recovery modules of file system manager 42 and/or application 40, should indicate that the time image of interest does not need repair or recovery. For example, as noted above when the recovery module of file system manager 32 is first initiated, the first or one of the first transactions it generates is a transaction to read the final metadata of the image, and if this data indicates that all metadata of the image is consistent, no further processing is needed by the recovery module of file system 32. Data stored in each entry of the scratchpad journal should include final metadata indicating that all the metadata of the associated time image is consistent, thus obviating the need to re-execute the recovery process when CDP system 92 receives a request for restoration data.

While CDP systems can provide restoration data for use in restoring a corrupted file to the state it occupied prior to the corrupting event, they may not be able to protect against unavailability of the data processing system that stores the file due to any number of problems. For example, volume V may become unavailable to application 30 via file system manager 32 in FIG. 1 or 6 due to a failure of network 16 that couples server 12 to data storage system 14. When this happens, application 30 may not be able to process data contained in volume V via file system manager 32 in response to requests application 30 receives from client computer systems. Businesses or other entities may employ replication to protect against unavailability of data processing systems such as data processing systems 10 and 90 shown in FIGS. 1 and 6, respectively. In general, data replication is a technique used to maintain copies of production data at geographically remote data processing systems called secondary data processing systems. For example, volume V in FIG. 1 or 6 can be replicated at a geographically remote secondary data processing system. If a disaster occurs at the data processing system 10 or 90 (hereinafter the primary data processing system), copies of application 30 and file system manager 32 can be restarted at the secondary data processing system, and the copy of application 30 at the secondary system can access and process data in the replicated copy of volume V in response to requests the copy of application 30 receives from client computer systems.

Figure 10:
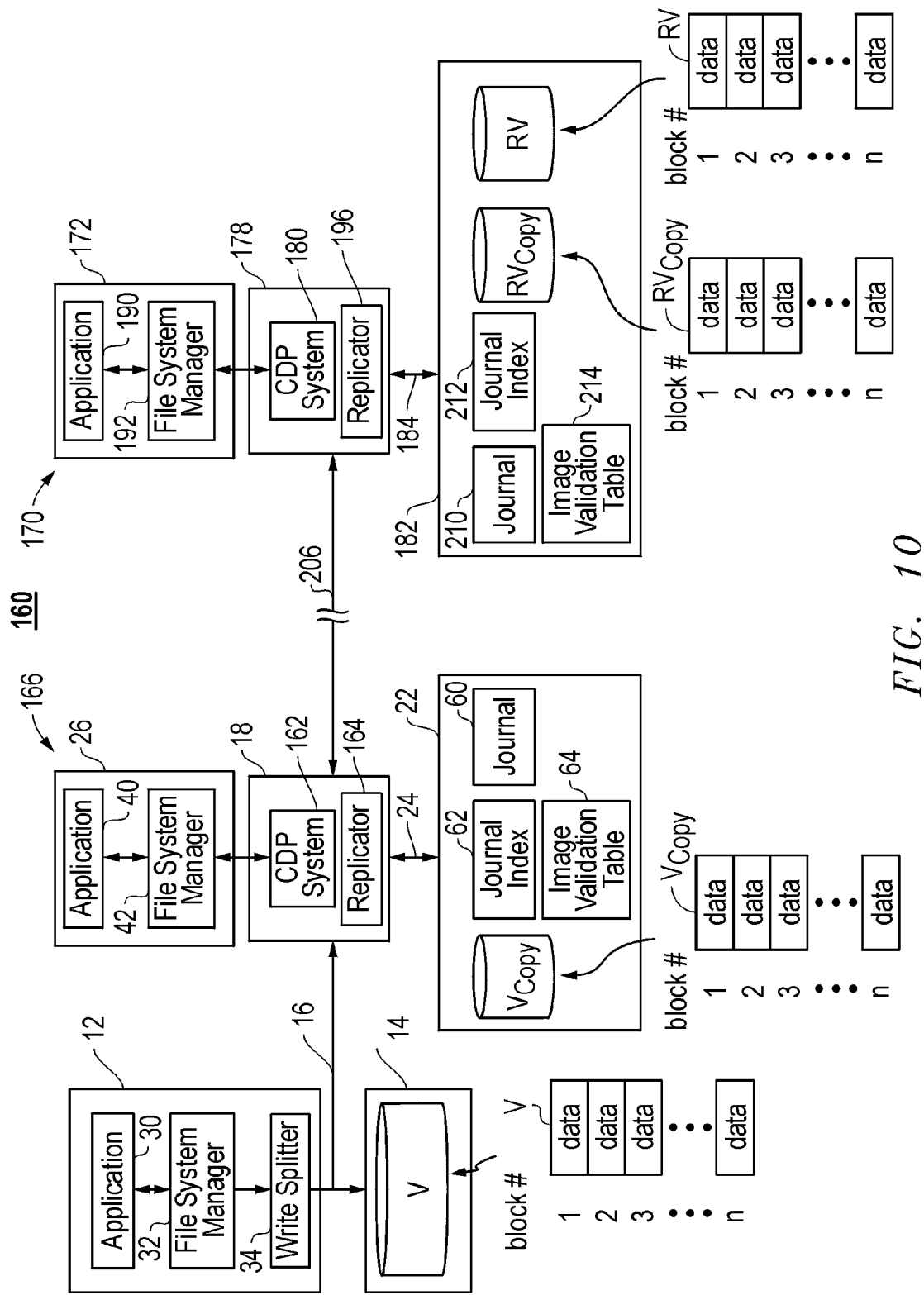
FIG. 10 illustrates a block diagram of relevant components in a data processing system employing data replication.

FIG. 10 illustrates, in block diagram form, relevant components of a system 160 which employs continuous data protection and replication. System 160 includes primary system 166, which is the data processing system 10 of FIG. 1 with CDP system 20 replaced by CDP system 162 and with a replicator 164 to appliance 18. In one embodiment, replicator 164 may take form in instructions executing one or more processors of appliance 18. Primary system 166 is in data communication with a secondary system 170, which includes components that are similar to some components contained within primary system 166. In particular, secondary system 170 includes a computer system (e.g., a server) 172 coupled to a data storage system 182 via a computer system (e.g., an appliance) 178, which includes a CDP system 180 and a replicator 196. In one embodiment, CDP system 180 takes form in instructions executing on one or more processors of network appliance 178. Likewise, replicator 196 may take form in instructions executing on one or more processors of network appliance 178. CDP system 180 is shown coupled to data storage system 182 via a communication link 184.

Data storage system 182 may take form in one or more disc arrays. Although not shown, virtualization software such as a volume manager logically aggregates memory of the hard disks of the disk arrays to create a volume into which a replication of volume V may be stored. The replication of volume V will hereinafter be referred to as replication volume RV. FIG. 10 shows a graphical representation of replication volume RV, which includes n data blocks that store a replicated copy of the contents contained within the n blocks, respectively, of volume V. As will be more fully described below, the contents of volume RV are synchronized with the contents of volume V.

Virtualization software may logically aggregate memory of other hard disks of data storage system 182 to create an additional data volume (hereinafter volume RVcopy) that stores a point-in-time copy of the data in volume RV. FIG. 10 shows a graphical representation of RVcopy, which includes n data blocks corresponding to the n data blocks of volume RV, respectively. The n data blocks of RVcopy store a copy of the contents contained within the n blocks, respectively, of volume RV that existed at the time volume RVcopy was first created. In an alternative embodiment, RVcopy may be maintained as a continuously updated copy of volume RV; however the present invention will be described with respect to volume RVcopy as a static, point-in-time copy of volume RV. For purposes of explanation only, volumes Vcopy and RVcopy are created identical to each other.

Server 172 includes an application 190 in data communication with file system manager 192. In the event of a failure of primary system 166, requests generated by client computer systems (not shown) can be diverted from application 30 to application 190, and application 190 can process the diverted requests using file system manager 192 and replicated volume RV.

Replicator 196 is in data communication with replicator 164 of primary system 166 via a network 206 such as the Internet. Further, CDP system 180 is in data communication with CDP system 162 via network 206. Network 206 facilitates transmission of replication messages from replicator 164 to replicator 196 of secondary system 170. Network 206 facilitates transmission of messages from CDP system 180 to CDP system 162 as will be more fully described below.

In one embodiment, application 190 is identical to applications 30 and 40 of the primary system 166. In one embodiment, file system manager 192 is identical to file system managers 32 and 42 of primary system 166. Application 1900 and file system manager 192 may each include a recovery module, which operate in identical fashion to the recovery modules of application 40 and file system manager 42, respectively, described above.

Business Continuance best practices often require validation of replicated data (e.g., volume RV) on a regular basis in order to ensure that an application (e.g., application 190) can operate properly on the secondary site (e.g., secondary data processing system 170) in the event of failure or unavailability of the primary site (e.g., primary data processing system 166). The procedure is used to detect disaster recovery risks and infrastructure vulnerabilities. CDP system 180 should be able to provide images of RV which can be validated via the recovery modules of application 190 and/or file system manager 192 in the same fashion that images of V were validated. This process of validation is generally called "Disaster Recovery Fire Drill." Products like Veritas Cluster Servers provides automation of Disaster Recovery Fire Drill. E.g The VERITAS Disaster Recovery Fire Drill is the procedure for testing the configuration's fault readiness by mimicking a failover without stopping the applications at the primary data processing system. A typical Disaster Recovery Fire Drill brings up a database or application (on a copy of data, whether using VERITAS Volume Replicator or third-party replication solutions) on the secondary data processing system to make sure the application is capable of coming up online at the secondary data processing system in case of a failure at the primary data processing system that renders it unavailable to client computer systems.

CDP system 180 can provide images of RV, which can be validated via the recovery modules of application 190 and/or file system manager 192 in the same fashion that images of volume V were validated as described above. During validation of an image of RV, the recovery module of file system manager 192 may generate transactions to read or write data (or metadata) to the image of volume RV provided by CDP system 180. Moreover, during image validation, the recovery module of application 190 may generate transactions to read or write data to the image of volume RV via file system manager 192. Like the process performed by the recovery module of file system manager 42, the process performed by the recovery module of file system manager 192 may include reading metadata and/or data from the image of volume RV provided by CDP system 180, checking the metadata, correcting the metadata if needed, and writing corrected metadata. Transactions generated by the recovery module of file system manager 192 may include a transaction to write final metadata indicating whether the metadata of the image is consistent. Appliance 178, like appliance 18 of the primary system 166, contains a scratchpad memory into which data can be written by the recovery module of file system manger 192 and/or application 190 during image validation. In the embodiment shown within FIG. 10, after the image is validated, the contents of the scratchpad memory in appliance 178 are deleted, including final metadata indicating whether metadata of the image is consistent or inconsistent.

As noted above, replicator 164 is in data communication with write splitter 34 of the primary system 166. Replicator 164 receives a copy of each transaction for writing new data to volume V that is generated by file system manager 32 via write splitter. Indeed, replicator 164 and CDP system 162 receive the same copy of each write transaction from write splitter 34. Replicator 164 generates a replication message for each write transaction it receives. The replicator message includes the new data and time stamp contained within the corresponding write transaction received from file system manager 32 via write splitter 34. In addition, the replicator message includes an identity of the block or blocks in volume V where the new data is to be written. For purposes of explanation only, the present invention will be described with reference to replicator 164 receiving copies of transactions to write data to a single block within volume V. Moreover, it will be presumed that the transactions (copies of which are received by replicator 164), when implemented, result in all data in the identified block of volume V being overwritten with the new data. It is noted that the replicator message may include additional information in other embodiments.

In one embodiment, replicator messages generated by replicator 164 are transmitted to replicator 196 via network 206 in the order in which they were generated by file system manager 32. As will be more fully described below, the contents of the messages received at replicator 196 are subsequently used in updating or synchronizing the contents of volume RV, thereby maintaining volume RV as a replication of volume V. Replication can occur either synchronously or asynchronously.

Replicator 196 receives the replication messages from replicator 164. Replicator 196, in response, may generate respective transactions for writing data to volume RV. In essence, replication receiver module 196 recreates the write transactions received by replicator 164 in the order in which they are received by replicator 164. The write transactions recreated by replication receiver module 196 may be subsequently used to update volume RV. The write transactions recreated by replication receiver module 196 (or copies thereof) may also be provided to CDP system 180.

CDP system 180 logs a copy of the new data contained in each of the write transactions it receives from replicator 196. CDP system 180 operates in a fashion similar to the process shown in FIG. 2 in response to receiving these write transactions copies. More particularly, in response to receiving a copy of a transaction to write new data (or metadata) D to block z, CDP system 180 may store a copy of new data D in entry of journal 210, which is formed in memory of data storage system 182. CDP system may also create a new index entry when new data D is written to journal 210. The index entry identifies the entry in journal 210 where new data D was stored. The index entry may also include the time stamp contained in the transaction for writing data D to block z. It is noted the timestamp was originally generated by file system manager 32 when file system manager 32 generated the corresponding transaction for writing new data D. Lastly, the index entry created by CDP system 180 includes the block number (e.g., m) identified in the write transaction it recieves. CDP system 180 stores the newly created index entry into journal index 212, which is formed in memory of data storage system 182.

CDP system 162 operates like CDP system 20 in response to receiving write transaction copies from write splitter 34; CDP system 162 operates according to the process shown in FIG. 2 in response to receiving write transaction copies from write splitter 34. As such, the contents of journal 210 and journal index 212 should be identical to the contents of journal 60 and journal index 62, respectively, described above although the contents of journal 210 and journal index 212 may lag the contents of journal 60 and journal index 62, respectively, due to the delay between the time CDP system 162 receives write transactions from write splitter 34 and the time when CDP system 180 receives corresponding write transactions from replicator 196.

CDP system 180 can use RVcopy, journal 210, and journal index 212 to provide time images of volume RV. In general, a time image of volume V as it existed at time t, which is provided by CDP system 20, should be identical in data content to a time image of volume RV as it existed at time t, which is provided by CDP system 180. The recovery modules of application 190 and/or file system manager 192, can be used to validate images provided by CDP system 180. Validation of the images provided by CDP system 180 is a process identical or nearly identical in operation to the process described above for validating images provided by CDP system 20.

CDP system 180 provides images of volume RV for validation at regularly scheduled times (e.g., approximately every 10 minutes). In one embodiment, a timer in secondary system 170 tracks the time since the last validation of an image of volume RV. Once a predetermined amount of time (e.g., 10 minutes) has passed since the last image validation, the validation process is implemented for the image of volume RV that existed at the time identified by the time stamp contained in the next write transaction received by CDP system 180. The timer is reset to 0 after the validation process is started. In an alternative embodiment, a counter can be used to count the number of write transactions received by CDP system 180, and the validation process is implemented for the image of volume RV that existed at the time identified by the time stamp contained in the next write transaction received by CDP system 180 after the counter indicates that a predetermined number (e.g., 10,000) of write transactions have been received. The counter is reset to 0 after the validation process is started.

CDP system 180 records the results of each regularly scheduled validation process as an entry in a validation table 214. Each entry created by CDP system 180 and subsequently stored in table 214, includes a time stamp VTSx and a result of the validation process performed on the volume RV image as it existed at the time identified by the time stamp VTSx. If the image of volume RV is successfully validated (e.g., if the final metadata written to the scratchpad indicates all metadata of the image is consistent), the result in the entry is marked "valid." If the image cannot be successfully validated (e.g., the final metadata written to the scratchpad indicates metadata of the image is inconsistent), the result is marked as "invalid." Additionally, CDP system 180 creates a message containing a copy of each newly created image validation table entry, and this message is subsequently transmitted to CDP system 162 via network 206. CDP system 162, in response to receiving the message, copies the image validation table entry contained therein, into image validation table 64. In this fashion, image validation table 64 is maintained as an identical copy of the image validation table 214, although the contents of table 64 may lag the contents of table 214.

While the operation of CDP system 162 and CDP system 20 are similar in many regards, differences exist. CDP system 20 creates a new entry for table 64 with each regularly scheduled image validation process. CDP system 162, as shown above, does not create a new entry; CDP system 162 stores new entries created by CDP system 180. CDP system 20 provides images of volume V for validation at regularly scheduled times. CDP system 162 does not provide images of volume V for validation at regularly scheduled time. Moreover, CDP system 162 need not respond to transactions generated by file system 42 during image regularly scheduled image validation. The process of FIG. 2 implemented by CDP system 20 should be suspended with each regularly scheduled image validation process so that CDP system 20 can respond to read and write transactions generated by the recovery module of file system manager 42. As an aside new transactions received from write splitter 34 may need to be stored in a buffer (e.g., a FIFO buffer, not shown) during this suspension until the image validation process ends. Alternatively, CDP system 20 in FIG. 1 can continue to process new write transactions received from write splitter 34 in accordance with that shown in FIG. 2 while a regularly scheduled image validation process is proceeding; however, since the data processing bandwidth of CDP system 20 is limited, the number of write transactions processed by CDP system 20 in a given amount of time in accordance with the process shown in FIG. 2, may be reduced while the image validation process is proceeding, since CDP system 20 is also responding to transactions generated by the recovery module of file system manager 42 for reading or writing data to an image of volume V. Regularly scheduled image validations, however, are not needed in the primary system 166 of FIG. 10. Thus, unlike CDP system 20, CDP system 162 in FIG. 10 need not suspend the operations it performs in accordance with the process shown in FIG. 2 in response to receiving write transactions from write splitter 34.

CDP system 162 can operate in accordance with the process shown in FIG. 5, using the validation table entries created by CDP system 180. This means that CDP system 162 must provide an image for a revalidation attempt in accordance with step 72, and CDP system 162 must respond to read or write requests generated by file system manager 42 during the image revalidation attempt of step 74. Again, however, the process performed by CDP system 162 in accordance with that shown in FIG. 2, may be suspended or slowed while the image is re-validated in step 74. In an alternative embodiment described with reference to FIG. 11, the validation process associated with step 74 can be reduced or eliminated.

Figure 11:
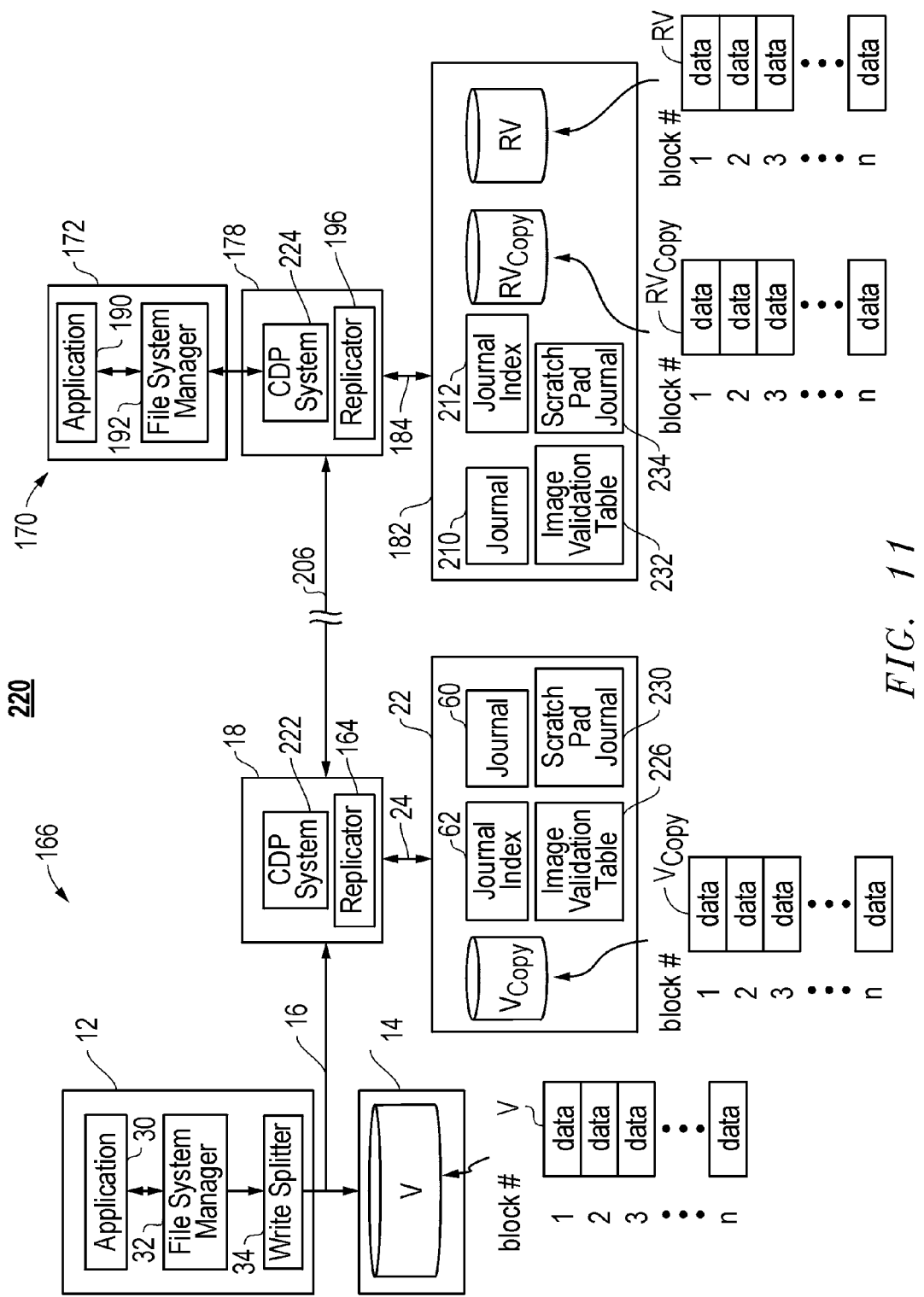
FIG. 11 illustrates a block diagram of relevant components in an alternative data processing system employing data replication.

FIG. 11 illustrates in block diagram form, relevant components of a data processing system 220 employing alternative CDP systems 222 and 224 within primary system 166 and secondary system 170, respectively. System 220 shown in FIG. 11 is similar to system 160 shown in FIG. 10 with CDP system 162 replaced by CDP system 222 and CDP system 180 replaced by CDP system 224. Moreover, image validation table 64 is replaced by image validation table 226 and scratchpad journal 230. Lastly, image validation table 214 in FIG. 10 is replaced by image validation table 232 and scratchpad journal 234 as shown in FIG. 11. Data system 220 in FIG. 11 lacks computer system 26. However, in an alternative embodiment, computer 26, including application 40 and file system manager 42, may be coupled to CDP system 222.

CDP system 222, like CDP system 162 or CDP system 20, can receive transactions from write splitter 34 to write new data (or metadata) D to one or more blocks of volume V. CDP system 222, like CDP system 162 or CDP system 20, can operate according to the process shown in FIG. 2 in response to receiving a transaction to write new data D to volume V. CDP system 222 maintains journal index 62 and journal 60 in the same fashion as CDP system 162 or CDP system 20 described above.

CDP system 224, like CDP system 180 presents images of volume RV at regularly scheduled times (e.g., approximately every 10 minutes) for validation. During image validation, the recovery module of file system manager 192 may generate transactions to read or write data (or metadata) to the image of volume RV. Also during regularly scheduled image validation, the recovery module of application 190 may generate transactions to read or write data to the image of volume RV via file system manager 192. Data to be written to the image during image validation is temporarily stored in the scratchpad memory of appliance 178. As noted above, CDP system 180 deletes the data written to the scratchpad memory, regardless of whether the image validation at that time was successful (e.g., the final metadata indicates all metadata of the image is consistent). After completion of the regularly scheduled image validation processes, if the validation process is successful (e.g., the final metadata indicates all metadata of the image is consistent) CDP system 224 may copy the content of the scratchpad memory to scratchpad journal 234 before CDP system 224 deletes the contents of the scratchpad memory. Additionally, if the validation process is successful CDP system 224 may transmit a copy of the content of the scratchpad memory to CDP system 222 in a message via communication network 206. CDP system 222, in response to receiving the message, may store a copy of the scratchpad memory contents into scratch pad journal 230.

CDP system 224 can operate in accordance with a process similar to that shown in FIG. 7 after initiation of a regularly scheduled process to validate an image of volume RV. More particularly, when the image validation starts CDP system 224 may create a new validation table entry, which will be associated with the regularly scheduled image validation process. CDP system 224 should receive a transaction via the recovery module of file system manager 192, to write new data c (e.g., file metadata) to block m of volume RV, where m is a variable. CDP system 224 writes data c to the scratchpad memory of appliance 178. It is noted that the scratchpad memory may contain a prior copy of block m data as a result of CDP system 224 processing a prior write transaction that was received from the recovery module of for example, file system manager 192. In this situation, CDP system 224 overwrites the existing data of block m in the scratchpad memory with new data c. One of ordinary skill in the art will recognize that a CDP system 224 may first access the scratchpad memory in attempt to retrieve data sought by a read transaction generated by the recovery module of file system manager 192 during the validation process, and if the requested data is not contained in the scratchpad memory, CDP system 224 will access journal 210 and RVcopy in succession to retrieve data sought by the read transaction.

After new data c is written to the scratchpad memory, CDP system 224 may check to see whether it has received a signal(s) from the recovery modules of file system manager 192 and/or application 190, indicating that the validation process has completed. If no such signal(s) has been received after data c is written, CDP system 224 waits for the next write transaction. Eventually, however, CDP system 224 will receive an indication that the image validation process has completed. If the image was successfully validated (e.g., the final metadata indicates all metadata of the image is consistent), CDP system 224 will create a new entry in scratchpad journal 234. Also, if the image was successfully validated, CDP system 224 may copy the contents of scratchpad memory (including, in one embodiment, the data of the final metadata write transaction) in appliance 178 to the newly created entry in scratchpad journal 234. Additionally, as noted above, CDP system 224 sends a copy of the contents of the scratchpad memory to CDP system 222 via network 206, again if the image validation process is successful. CDP system 222, in response, creates a new entry in scratchpad journal 230, and copies the scratchpad contents it receives from CDP system 224 to the newly created entry in scratchpad journal 230.

If CDP system 234 is informed the image validation was unsuccessful (e.g., the final metadata indicates all metadata of the image is consistent), or in response to copying the contents of scratchpad memory to journal 234 and sending a copy of the scratchpad memory to CDP system 222 for subsequent storage into journal 230, CDP system 224 deletes the contents of the scratchpad memory in appliance 78. Thereafter CDP system 224 updates the newly created validation table entry by adding thereto (1) a time stamp identifying the image validation time (e.g., the time identified by the time stamp contained in the next write transaction received by CDP system 224 after the predetermined amount of time has passed since the last image validation, or the time identified by the time stamp contained in the next write transaction received by CDP system 224 after the predetermined number of write transactions have been received by CDP system 224 since the last image validation), (2) the result of the validation process (i.e., valid or invalid), and (3) if the validation process is successful, the identity of the new entry in scratchpad journal 234 where the contents of the scratchpad memory were copied. Thereafter, CDP system 224 stores the updated validation table entry into validation table 232. CDP system 224 may also send a copy of this newly created validation table entry to CDP system 222 in a message via network 206. CDP system 222 receives the message and stores the validation table entry it receives from CDP system 224 into validation table 226. It is noted that before CDP system 222 stores the validation table entry it receives into image validation table 226, CDP system 222 may replace the identity of the scratchpad journal 234 entry contained in the message received from CDP system 224 with the identity of the entry in scratchpad journal 230 where CDP system 222 stored the contents of the scratchpad memory that was received from CDP system 224. Thereafter, the process ends.

CDP system 222, like CDP system 162 or 20, can receive requests for a copy of restoration data from the restoration manager of server 12. CDP system 222, like CDP system 162 or 20, can operate in accordance the process shown in FIG. 9 in response to receiving a request for restoration data from the restoration manager. One of ordinary skill in the art will understand that because the contents of image validation table 226 and scratchpad journal 230 are, in essence, created by CDP system 224, images of volume V need not be validated in primary system 166 at regularly scheduled times, which in turn means that CDP system 222 need not provide images of volume V at regularly scheduled times for validation processing by recovery modules of a file system manager (e.g., file system manager 42 shown in FIG. 10) or other software components (e.g., application 40 shown in FIG. 10). Moreover, CDP system 222 need not suspend processing new write transactions received from write splitter 134 in accordance with the process shown in FIG. 2 in order to process read and/or write transactions from a recovery module of, for example, file system manager 42. Lastly, it is not necessary that primary system 166 shown in FIG. 11 include computer system 26 (see FIG. 10) coupled to appliance 18. However, if appliance 26 is coupled to appliance 18 in FIG. 11, in the alternative embodiment mentioned above, the recovery modules of file system manager 42 and/or application 40 should read the appropriate block within scratchpad journal 230 and learn that the final metadata stored therein indicates that no further recovery processing is needed.

Secondary node 170 in FIG. 10 or 11 can be used to process client computer requests in the event primary node 166 becomes unavailable. CDP systems 180 and 224 can be used to provide restoration data to a restoration manager (not shown) executing on server 172. If a user inadvertently corrupts data of a file on replication volume RV, CDP system 180 or 224 can provide restoration data for restoring the file to its pre-corrupted data state in much the same way CDP system 20 or 92, respectively, provided restoration data for restoring a corrupted file on volume V as described above. In an alternative embodiment, a CDP system executing on the secondary node can provide only image validation table entries and corresponding scratch pad entries to CDP system 222. In this embodiment, the CDP system does not provide restoration data for restoring a file on restoration volume RV to a prior, uncorrupted state. This concept is explained in greater detail with respect to the system shown in FIG. 12.

Figure 12:
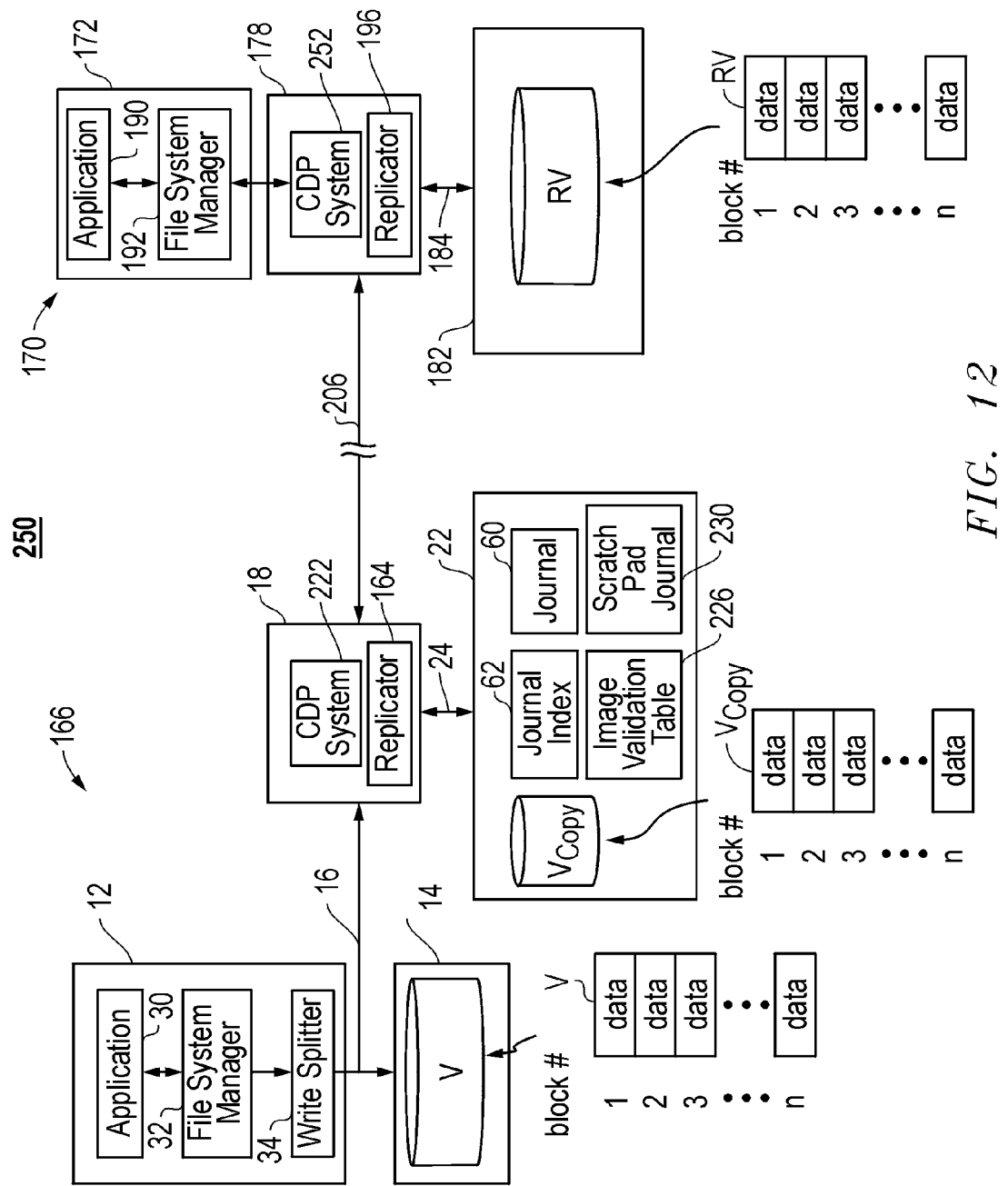
FIG. 12 illustrates a block diagram of relevant components in another data processing system employing data replication.

FIG. 12 illustrates in block diagram form, relevant components of a data processing system 250 employing an alternative CDP system 252 within secondary system 170. System 250 shown in FIG. 12 is similar to system 220 shown in FIG. 11 with CDP system 224 replaced by CDP system 252. System 250 lacks RVcopy, journal 210, journal index 212, image validation table 232, and scratchpad journal 234. CDP system 252, unlike CDP system 224 of FIG. 11, does not receive copies of write transactions generated by replicator 196.

CDP system 252 can present images of replicated volume RV at regularly scheduled times (e.g., approximately every 10 minutes or each time replicator 196 receives 10,000 replication messages from replicator 164) for validation. During image validation, the recovery module of file system manager 192 may generate transactions to read or write data (or metadata) to the image of volume RV. Also during regularly scheduled image validation, the recovery module of application 190 may generate transactions to read or write data to the image of volume RV via file system manager 192. In this embodiment, CDP system 252 accesses and reads data from replicated volume RV in response to receiving read requests during image validation. Data to be written to the image during image validation is temporarily stored in the scratchpad memory of appliance 178. After completion of the regularly scheduled image validation processes, if the validation process is successful (e.g., the final metadata indicates all metadata of the image is consistent) CDP system 252 may transmit a copy of the content of the scratchpad memory to CDP system 222 in a message via communication network 206. CDP system 222, in response to receiving the message, may store a copy of the scratchpad memory contents into scratch pad journal 230. In one embodiment, replicator 196 may buffer write transactions it generates in response to receiving replication messages from replicator 164, until the image validation process ends. When the image validation process ends, volume RV is updated in accordance with the buffered write transactions in the order in which they were buffered.

CDP system 252 can operate in accordance with a process similar to that shown in FIG. 7 after initiation of a regularly scheduled process to validate an image of volume RV. More particularly, when the image validation starts CDP system 252 may create a new validation table entry, which will be associated with the regularly scheduled image validation process. CDP system 252 should receive a transaction via the recovery module of file system manager 192, to write new data c (e.g., file metadata) to block m of volume RV, where m is a variable. CDP system 252 in response writes data c to the scratchpad memory of appliance 178. It is noted the scratchpad memory may contain a prior copy of block m data as a result of CDP system 252 processing a prior write transaction that was received from the recovery module of, for example, file system manager 192. In this situation, CDP system 252 overwrites the existing data of block m in the scratchpad memory with new data c. One of ordinary skill in the art will recognize that CDP system 252 may first access the scratchpad memory in attempt to retrieve data sought by a read transaction generated by the recovery module of file system manager 192 during the validation process, and if the requested data is not contained in the scratchpad memory, CDP system 252 will access volume RV to read the needed data.

After new data c is written to the scratchpad memory, CDP system 252 may check to see whether it has received a signal(s) from the recovery modules of file system manager 192 and/or application 190, indicating that the validation process has completed. If no such signal(s) has been received after data c is written, CDP system 252 waits for the next write transaction from the recovery module of file system manager 192 or application 190. Eventually, however, CDP system 252 will receive an indication that the image validation process has completed. If the image was successfully validated (e.g., the final metadata indicates all metadata of the image is consistent), CDP system 252 may send a copy of the contents of the scratchpad memory to CDP system 222 via network 206. CDP system 222, in response, creates a new entry in scratchpad journal 230, and copies the scratchpad contents it receives from CDP system 224 to the newly created entry in scratchpad journal 230. If the image was unsuccessfully validated, CDP system 252 does not send a copy of the scratch pad contents to CDP system 222 in one embodiment.

If CDP system 234 is informed the image validation was unsuccessful (e.g., the final metadata indicates all metadata of the image is consistent), or in response to sending a copy of the scratchpad memory to CDP system 222 for subsequent storage into journal 230, CDP system 224 deletes the contents of the scratchpad memory in appliance 78. Thereafter CDP system 224 updates the validation table entry it created at the beginning of the validation process by adding thereto (1) a time stamp identifying the image validation time (i.e., the time identified by the time stamp contained in the next message received by replicator 196 after the predetermined amount of time has passed since the last image validation, or after the predetermined number of write transactions have been received by replicator since the last image validation), and (2) the result of the validation process (i.e., valid or invalid. CDP system 252 may send a copy of this updated validation table entry to CDP system 222 in a message via network 206. CDP system 222 receives the message and stores the validation table entry it receives from CDP system 252 into validation table 226. It is noted that before CDP system 222 stores the validation table entry it receives into image validation table 226, CDP system 222 may add the identity of the entry in scratchpad journal 230 where CDP system 222 stored the contents of the scratchpad memory that was received from CDP system 252 during image validation process. Thereafter, the process ends. But CDP system 222 has the information in journal index 62, journal 60, image validation table 226, and scratch pad journal 230 that is needed to implement a request to restore a corrupted file in accordance with the same or similar process described in FIG. 9.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. A method comprising:
creating a copy of a data object;
creating a journal in memory;
creating an index in memory;
generating a plurality of write transactions after the creation of the data object copy, wherein
each of the write transactions comprises new data and an address in the data object where the new data is to be written;
storing copies of the new data in respective entries of the journal;

storing the addresses of the write transactions in respective entries of the index;
creating a plurality of images of the data object as it existed at respective points in time, wherein
each of the data object images is created using the data object copy, new data of one or more entries of the journal, and addresses of one or more entries of the index;
a computer system processing the plurality of data object images in accordance with an image validation process, wherein the image validation process comprises
pre-validating the plurality of data object images at regularly scheduled intervals subsequent to the creation of the data object copy,
tracking the time since a last image validation using a timer, and
initiating the timer to a predetermined amount of time;
creating a new validation table entry,
receiving additional write transactions to write additional new data, and
writing the additional new data to a scratchpad memory;
creating a new entry in a scratchpad journal upon successful completion of the image validation process comprising,
copying contents of the scratchpad memory to the newly created entry in the scratchpad journal,
deleting contents of the scratchpad memory, and
updating the newly created validation table entry comprising adding time stamps comprised in a next write transaction after the predetermined amount of time has passed since the last image validation,
adding an image validation process result,
adding an identity of the new entry in the scratchpad journal when the image validation process is successful,
creating a message comprising a copy of each newly created image validation table entry and subsequently transmitting the message, and
copying the image validation table entry contained therein into an image validation table, wherein
the image validation table is maintained as an identical copy of the image of the data object;
generating the image validation process result for each of the data object images that is processed in accordance with the image validation process, wherein
each of the image validation process results is set to a first state or a second state;
mapping each of image validation results to the time stamps, respectively;
in response to receiving a request to restore a portion of the data object to a data state that existed at a prior time T1, identifying an image validation process result set to the first state and mapped to a time stamp that is prior to T1.

2. The method of claim 1 further comprising:
reprocessing a first of the data object images in accordance with the image validation process, wherein the first data object image corresponds to the identified image result set to the first state and mapped to the time stamp that is prior to T1.

3. The method of claim 2 further comprising:
restoring the portion of the data object using the first data object image.

4. The method of claim 1 further comprising:
restoring the portion of the data object using a first of the data object images, wherein the first data object image corresponds to the identified image result set to the first state and mapped to the time stamp that is prior to T1.

5. The method of claim 1 further comprising:
in response to processing a first of the data image objects in accordance with the image validation process, generating a first write transaction for writing first new data to the first data image object;
writing the first new data to a first storage;
copying data contents of the first storage to a first memory object;
linking the first memory object with the first data image object.

6. One or more non-transitory computer readable mediums comprising instructions, wherein a method is implemented in response to executing the instructions, the method comprising:
creating a copy of a data object;
creating a journal in memory; creating an index in memory;
receiving a plurality of write transactions after the creation of the data object copy, wherein each of the write transactions comprises new data and an address in the data object where the new data is to be written;
creating a plurality of images of the data object as it existed at respective points in time, wherein each of the data object images is created using the data object copy, new data of one or more entries of the journal, and addresses of one or more entries of the index;
processing the plurality of data object images in accordance with an image validation process, wherein the image validation process comprises
pre-validating the plurality of data object images at regularly scheduled intervals subsequent to the creation of the data object copy,
tracking the time since a last image validation using a timer, and
initiating the timer to a predetermined amount of time;
creating a new validation table entry,
receiving additional write transactions to write additional new data, and
writing the additional new data to a scratchpad memory;
creating a new entry in a scratchpad journal upon successful completion of the image validation process comprising,
copying contents of the scratchpad memory to the newly created entry in the scratchpad journal,
deleting contents of the scratchpad memory, and
updating the newly created validation table entry
adding time stamps comprised in a next write transaction after the predetermined amount of time has passed since the last image validation,
adding an image validation process result,
adding an identity of the new entry in the scratchpad journal when the image validation process is successful,
creating a message comprising a copy of each newly created image validation table entry and subsequently transmitting the message, and
copying the image validation table entry contained therein into an image validation table, wherein
the image validation table is maintained as an identical copy of the image of the data object;
generating the image validation process result for each of the data object images that is processed in accordance with the image validation process, wherein each of the image validation process results is set to a first state or a second state; mapping each of image validation process results to the time stamps, respectively;
in response to receiving a request to restore a portion of the data object to a data state that existed at a prior time T1, identifying an image validation process result set to the first state and mapped to a time stamp that is prior to T1.

7. The one or more computer readable mediums of claim 6 wherein the method further comprises:
reprocessing a first of the data object images in accordance with the image validation process, wherein the first data object image corresponds to the image validation process result set to the first state and mapped to the time stamp that is prior to T1.

8. The one or more computer readable mediums of claim 7 wherein the method further comprises:
restoring the portion of the data object using the first data object image.

9. The one or more computer readable mediums of claim 6 wherein the method further comprises:
restoring the portion of the data object using a first of the data object images, wherein the first data object image corresponds to the identified image result set to the first state and mapped to the time stamp that is prior to T1.

10. The one or more computer readable mediums of claim 6 wherein the method further comprises:
in response to processing a first of the data image objects in accordance with the image validation process, generating a first write transaction for writing first new data to the first data image object;
writing the first new data to a first storage;
copying data contents of the first storage to a first memory object;
linking the first memory object with the first data image object.

11. A system comprising:
a primary system for storing a data object;
a secondary system coupled to the primary system, wherein the secondary system comprises a computer system comprising a memory that stores instructions executable by the computer system, wherein the computer system implements a method in response to executing the instructions, the method comprising: creating a copy of a data object; creating a journal in memory; creating an index in memory;
receiving a plurality of write transactions after the creation of the data object copy, wherein each of the write transactions comprises new data and an address in the data object where the new data is to be written;
creating a plurality of images of the data object as it existed at respective points in time, wherein each of the data object images is created using the data object copy, new data of one or more entries of the journal, and addresses of one or more entries of the index;
processing the plurality of data object images in accordance with an image validation process, wherein the image validation process comprises
pre-validating the plurality of data object images at regularly scheduled intervals subsequent to the creation of the data object copy,
tracking the time since a last image validation using a timer, and
initiating the timer to a predetermined amount of time;
creating a new validation table entry,
receiving additional write transactions to write additional new data, and writing the additional new data to a scratchpad memory;
creating a new entry in a scratchpad journal upon successful completion of the image validation process comprising,
copying contents of the scratchpad memory to the newly created entry in the scratchpad journal,
deleting contents of the scratchpad memory, and
updating the newly created validation table entry comprising
adding time stamps comprised in a next write transaction after the predetermined amount of time has passed since the last image validation,
adding an image validation process result,
adding an identity of the new entry in the scratchpad journal when the image validation process is successful,
creating a message comprising a copy of each newly created image validation table entry and subsequently transmitting the message, and
copying the image validation table entry contained therein into an image validation table, wherein
the image validation table is maintained as an identical copy of the image of the data object;
generating the image validation process result for each of the data object images that is processed in accordance with the image validation process, wherein each of the image validation process results is set to a first state or a second state; mapping each of image validation process results to the time stamps, respectively;
in response to receiving a request to restore a portion of the data object to a data state that existed at a prior time T1, identifying an image validation process result set to the first state and mapped to a time stamp that is prior to T1.

* * * * *